(12) United States Patent
Hu et al.

(10) Patent No.: US 11,243,357 B2
(45) Date of Patent: Feb. 8, 2022

(54) TRANSMITTER OPTICAL SUB-ASSEMBLY AND OPTICAL TRANSCEIVER ASSEMBLY

(71) Applicant: HUAWEI TECHNOLOGIES CO., LTD., Shenzhen (CN)

(72) Inventors: Chihao Hu, Wuhan (CN); Chuang Zhou, Shenzhen (CN); Xiaojun Zeng, Shenzhen (CN); Ye Wen, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/881,602

(22) Filed: May 22, 2020

(65) Prior Publication Data

US 2020/0284987 A1 Sep. 10, 2020

Related U.S. Application Data

(63) Continuation of application No. PCT/CN2018/096864, filed on Jul. 24, 2018.

(30) Foreign Application Priority Data

Nov. 29, 2017 (CN) .......................... 201711247876.6

(51) Int. Cl.
*G02B 6/32* (2006.01)
*G02B 6/42* (2006.01)
(Continued)

(52) U.S. Cl.
CPC ............. *G02B 6/32* (2013.01); *G02B 6/4204* (2013.01); *G02B 6/43* (2013.01); *G02B 7/1805* (2013.01); *H04B 10/40* (2013.01); *H04B 10/503* (2013.01)

(58) Field of Classification Search
CPC ................................ G02B 7/18; G02B 7/1805
See application file for complete search history.

(56) References Cited

U.S. PATENT DOCUMENTS 5,515,468 A * 5/1996 DeAndrea ............ G02B 6/4201
385/88
5,737,465 A 4/1998 Okochi
(Continued)

FOREIGN PATENT DOCUMENTS

CN 103869430 A 6/2014
CN 103941347 A 7/2014
(Continued)

OTHER PUBLICATIONS

Alan Symmons et al. Molded Optics: Precision molded glass challenges plastic optics, Jul. 1, 2011, Retrieved from the internet:https://www.laserfocusworld.com/optics/article/16562818/molded-optics-precision-molded-glass-challenges-plastic-optics, total 14 pages.

*Primary Examiner* — Sung H Pak
(74) *Attorney, Agent, or Firm* — Stein IP, LLC

(57) ABSTRACT

A transmitter optical sub-assembly, includes a prism body, a first lens, and a plug-in. The prism body includes a light inlet end and a light outlet end, the first lens is disposed between the light outlet end and the plug-in, and the plug-in includes a contact end. The contact end is located on a surface that is of the plug-in and that is away from the first lens, a center of the contact end is located on a focus on an optical path of the first lens, and the contact end is arc-shaped for a purpose of a gapless interconnection with an optical fiber, to reduce end face reflection of the contact end. An optical transceiver assembly includes the transmitter optical sub-assembly, and has comparatively small reflection and a comparatively small return loss of an optical fiber end face.

25 Claims, 2 Drawing Sheets

(51) Int. Cl.
　　　*G02B 6/43*　　　(2006.01)
　　　*G02B 7/18*　　　(2021.01)
　　　*H04B 10/40*　　(2013.01)
　　　*H04B 10/50*　　(2013.01)

(56) References Cited

U.S. PATENT DOCUMENTS

| | | |
|---|---|---|
| 6,888,988 B2 | 5/2005 | Vancoille et al. |
| 7,298,942 B2 | 11/2007 | Blasingame et al. |
| 8,328,436 B2 * | 12/2012 | Mitamura ............ G02B 6/4207 |
| | | 385/93 |
| 2009/0252192 A1 | 10/2009 | Jewell et al. |
| 2009/0263087 A1 | 10/2009 | Oshima et al. |
| 2009/0310915 A1 | 12/2009 | Jewell et al. |
| 2014/0226990 A1 | 8/2014 | Hui et al. |
| 2015/0125110 A1 | 5/2015 | Anderson et al. |
| 2016/0341903 A1 | 11/2016 | Tang et al. |

FOREIGN PATENT DOCUMENTS

| | | |
|---|---|---|
| CN | 103941352 A | 7/2014 |
| CN | 104111503 A | 10/2014 |
| CN | 104364685 A | 2/2015 |
| CN | 105518506 A | 4/2016 |
| JP | H10268164 A | 10/1998 |
| JP | 2002258114 A | 9/2002 |
| WO | 2006063807 A2 | 6/2006 |

* cited by examiner

TRANSMITTER OPTICAL SUB-ASSEMBLY AND OPTICAL TRANSCEIVER ASSEMBLY

CROSS-REFERENCE TO RELATED APPLICATIONS

This application is a continuation of International Application No. PCT/CN2018/096864, filed on Jul. 24, 2018, which claims priority to Chinese Patent Application No. 201711247876.6, filed on Nov. 29, 2017, The disclosures of the aforementioned applications are hereby incorporated by reference in their entireties.

TECHNICAL FIELD

Aspects of the present application relate to an optical fiber communication device, and in particular, to a transmitter optical sub-assembly (TOSA) for optical fiber communication.

BACKGROUND

Increasing usage in video stream, big data, and cloud computing causes "data avalanche", and this raises requirements higher on a storage capability and a data transmission capability of a server. To meet explosive growth of data services, optical-electrical interconnection modules of an enterprise network and a data center are developing a trend with a higher speed and a higher density. An optical transceiver assembly becomes an indispensable member of the optical-electrical interconnection module, and performs optical transmission between a VCSEL (Vertical cavity surface emitting laser) and an optical fiber by using a transmitter optical sub-assembly. To implement reliable data signal transmission at a higher data rate, smaller signal attenuation in an optical communication link results in better communication quality. The following is a continuous researched direction in the industry. How to reduce reflection and a return loss of an optical fiber end face, so as to reduce optical power reflected from the optical fiber end face to the VCSEL and ensure stable running of the VCSEL.

SUMMARY

Embodiments of the present application provide a transmitter optical sub-assembly, to implement small reflection and a small return loss of an optical fiber end face, and small signal attenuation.

According to a first aspect, in an implementation, an embodiment of the present application provides a transmitter optical sub-assembly, including a prism body, a first lens, and a plug-in. The prism body includes a light inlet end and a light outlet end, the first lens is disposed between the light outlet end and the plug-in, and the plug-in includes a contact end. The contact end is located on a surface that is of the plug-in and that is away from the first lens, a center of the contact end is located on a focus on an optical path of the first lens, and the contact end is arc-shaped for a purpose of a gapless interconnection with an optical fiber, to reduce end face reflection of the contact end.

In this embodiment of the present application, the contact end between the plug-in and the optical fiber is set to be arc-shaped, and the arc-shaped contact end is in contact with an end face of the optical fiber, to implement the gapless interconnection. In this way, there is no air medium on an optical transmission path between the plug-in and the optical fiber, and light directly enters the optical fiber from the plug-in, so that the end face reflection of the contact end can be reduced.

In an implementation, the plug-in includes a first end face, a second end face, and a circumferential surface that is connected between the first end face and the second end face. The first end face faces the first lens, the second end face is away from the first lens, the second end face is arc-shaped overall, and the contact end is formed in a central region of the second end face.

In another implementation, the second end face may also include an arc surface and a pair of connection surfaces that are located on two sides of the arc face. The pair of connection surfaces are respectively connected between two ends of the arc surface and the circumferential surface, and the contact end is the arc surface between the pair of connection surfaces. Specifically, the pair of connection surfaces may be symmetrically disposed on the two sides of the arc surface, and the pair of connection surfaces may be planes, or may be other irregular surfaces. A specific shape of the second end face is not limited in this application, provided that the contact end in the central region of the second end face is set to be arc-shaped.

In an implementation, the prism body includes a conductive part and a conductive assembly part that are integrally formed. An accommodation space is disposed in the assembly part, and a bottom of the accommodation space is the light outlet end of the prism body. The assembly part includes a first end that is connected to the conductive part and a second end that is away from the first end. An opening is formed in the accommodation space at the second end, and the opening allows the plug-in and the optical fiber to insert into the accommodation space. The circumferential surface of the plug-in is in contact with a side wall of the accommodation space.

The assembly part may be hollow sleeve shaped, and a protrusion may be further disposed on an outer circumferential surface of the assembly part. The protrusion may be configured to implement limiting between the transmitter optical sub-assembly and a peripheral element, for example, fixing the transmitter optical sub-assembly to a housing of an optical transceiver. A shape and a size of the accommodation space in the assembly part match the optical fiber, and the optical fiber is inserted into the accommodation space. An outer surface of the optical fiber and the side wall of the accommodation space are in contact to implement positioning the optical fiber. In addition, the plug-in is also inserted into the accommodation space, and both the plug-in and an axial position of the optical fiber may be determined by using the side wall of the accommodation space. In an implementation, the accommodation space is a cylindrical structure or an axisymmetric structure, and a central axis of the accommodation space is an optical axis of the light outlet end of the prism body.

In an implementation, the first lens is integrally formed at the light outlet end of the prism body. An integrated structure may implement higher optical conduction efficiency and effectively reduce a return loss. Certainly, the first lens and the prism body may be alternatively separated structures. The first lens is installed from the opening of the accommodation space to the light outlet end, and a position of the first lens is limited by using a limiting structure that is disposed at a position of the light outlet end.

In an implementation, the side wall of the accommodation space includes a limiting step. The limiting step faces the opening, and the limiting step is configured to abut against the first end face of the plug-in. In this implementation, a position of the plug-in is limited by using the limiting step, so that after the plug-in is inserted into the accommodation space, the contact end of the plug-in may be implemented to be on the focus of the first lens by abutting against the limiting step. The first end face of the plug-in may be fixed to the limiting step by using optical adhesive.

In an implementation, the conductive part includes a first surface, a second surface, and a reflective surface. The light inlet end is disposed on the first surface, the light outlet end is disposed on one side of the second surface. A light outlet end disposed on one side of the second surface means that the light outlet end may be disposed on the second surface, or may be disposed on another surface close to the second surface. The assembly part is connected to the second surface, and the reflective surface is configured to reflect light incident from the light inlet end to the light outlet end. In this application, the reflective surface is disposed between the light inlet end and the light outlet end of the conductive part, and the light incident from the light inlet end is reflected to the light outlet end by using the reflective surface. This helps reduce a plane size of the conductive part, and effectively use a space size, to make the transmitter optical sub-assembly have advantages of being small and having good space usage.

Specifically, an extension direction of the first surface is perpendicular to an extension direction of the second surface. Perpendicularity described herein also includes approximate perpendicularity. An included angle between the first surface and the second surface may be in an appropriate range approximate to 90 degrees, for example, a range from 80 degrees to 100 degrees is approximate perpendicularity.

In an implementation, a second lens is disposed on the first surface, and the second lens is integrally formed at the light inlet end of the prism body. It may be understood that the second lens and the prism body may be alternatively separated structures.

In an implementation, the prism body further includes a support part, and the support part is connected to the first surface of the conductive part. The support part surrounds the second lens and is configured to support the conductive part on a substrate. The support part is connected to the substrate, and the support part, the substrate, and the first surface jointly form an enclosed surrounding space. The support part may be fixed to the substrate and is sealed by using adhesive, and a waterproof structure may be disposed to protect a light source device on the substrate. Specifically, a groove may be disposed on a surface of the substrate, and waterproof adhesive is filled in the groove. Then, the support part is aligned with the groove, and the support part is bonded into the groove by using the waterproof adhesive. One end of the support part is embedded into the groove to form the waterproof structure.

In an implementation, a dielectric optical constant of the plug-in is close to or the same as a dielectric optical constant of the optical fiber. A range for which the dielectric optical constant of the plug-in is close to the dielectric optical constant of the optical fiber meets the following. The dielectric optical constant of the plug-in is greater than a dielectric optical constant of air, and a smaller difference between the dielectric optical constant of the plug-in and the dielectric optical constant of the optical fiber is better. Optimally, the dielectric optical constant of the plug-in equals the dielectric optical constant of the optical fiber.

According to a second aspect, this application further provides an optical transceiver assembly, including a substrate, a laser that is disposed on the substrate, and the transmitter optical sub-assembly. A light inlet end of the transmitter optical sub-assembly faces the laser to receive light emitted by the laser. The light enters the optical fiber after passing through the light outlet end and the plug-in.

BRIEF DESCRIPTION OF DRAWINGS

To describe the technical solutions in the embodiments of the present application more clearly, the following briefly describes the accompanying drawings required for describing the embodiments of the present application.

and

Figure 4:
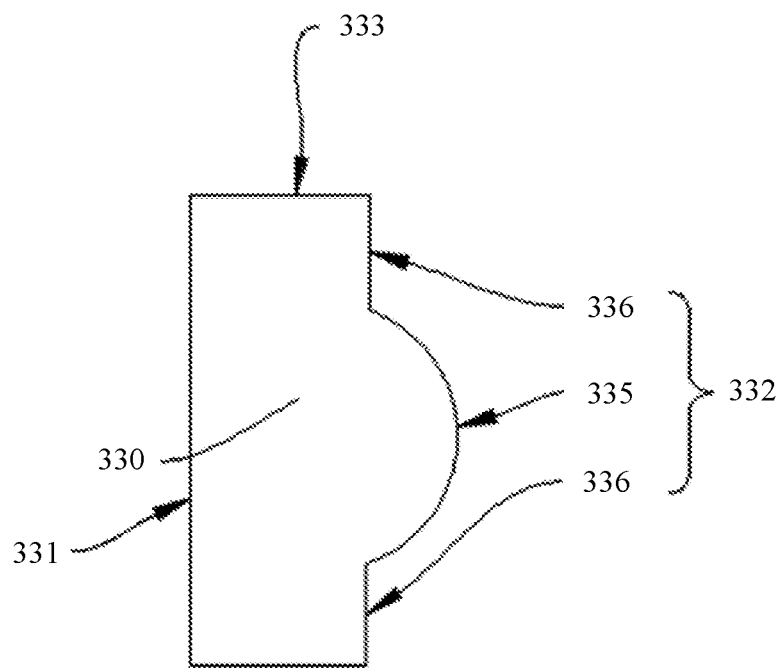

FIG. 4 is a schematic diagram of a plug-in of a transmitter optical sub-assembly according to an implementation of the present application.

DESCRIPTION OF EMBODIMENTS

The following describes embodiments of the present application with reference to the accompanying drawings in the embodiments of the present application.

Figure 1:
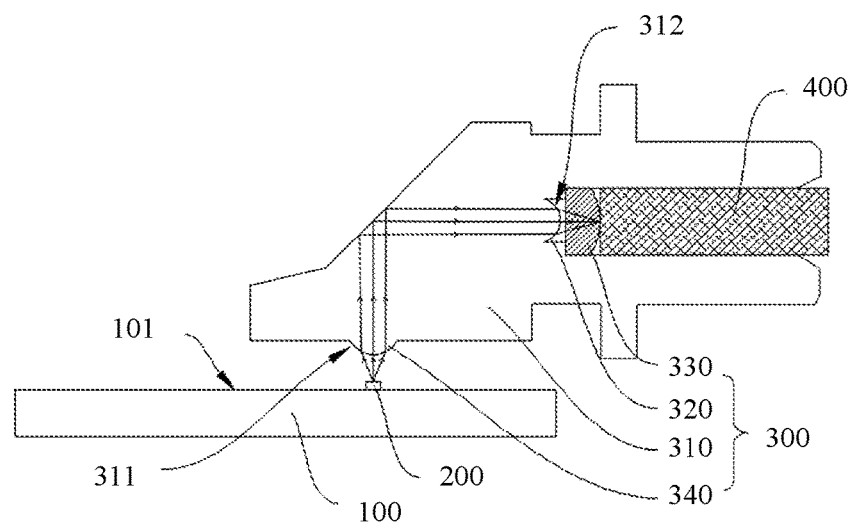
FIG. 1 is a schematic cross-sectional view of an optical transceiver assembly according to an implementation of the present application.

As shown in FIG. 1, a transmitter optical sub-assembly 300 (TOSA) provided in an embodiment of the present application is applied to an optical transceiver assembly. The optical transceiver assembly includes a substrate 100, a laser 200 that is disposed on the substrate 100, and the transmitter optical sub-assembly 300. A light inlet end 311 of the transmitter optical sub-assembly 300 faces the laser 200 to receive light emitted by the laser 200, and the light enters an optical fiber 400 after passing through a light outlet end 312 and a plug-in 330. The laser 200 is a vertical cavity surface emitting laser (VCSEL).

Figure 2:
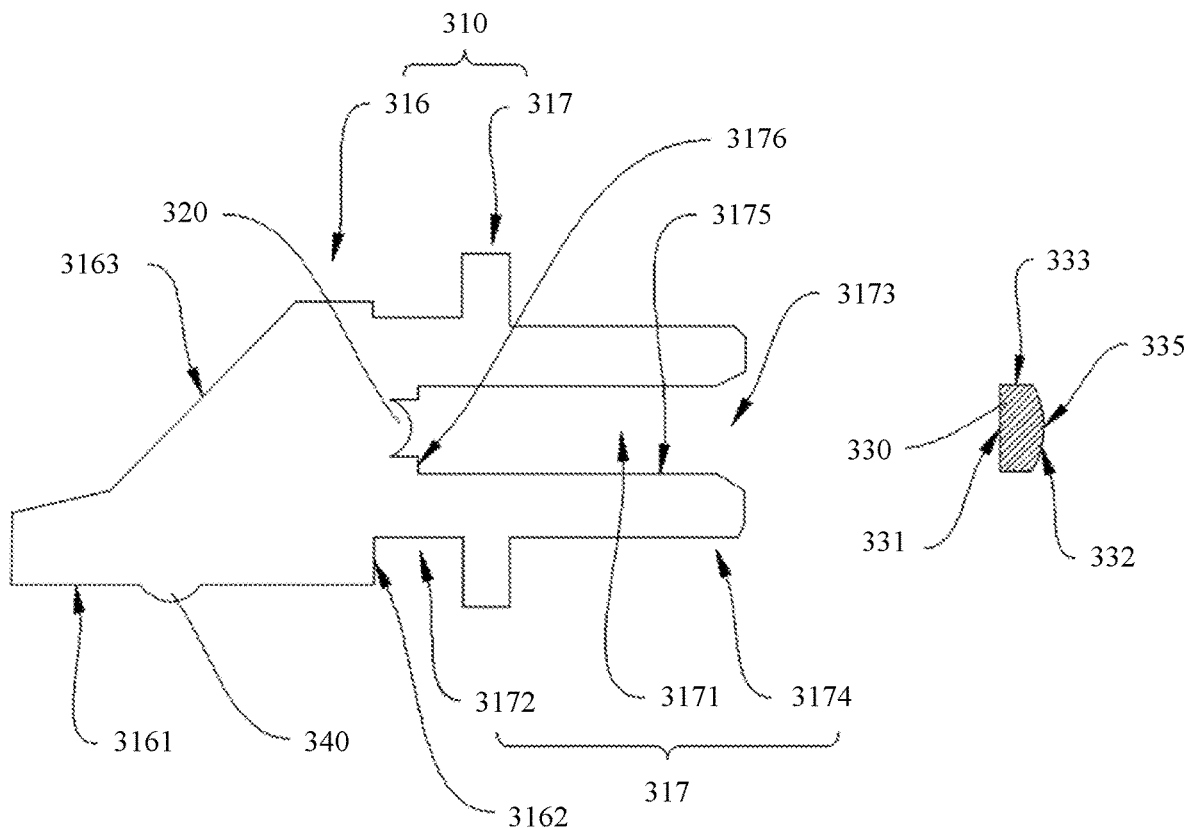
FIG. 2 is a schematic exploded view of a transmitter optical sub-assembly according to an implementation of the present application.

Referring to FIG. 1 and FIG. 2, the transmitter optical sub-assembly 300 provided in this embodiment of the present application includes a prism body 310, a first lens 320, and the plug-in 330. The prism body 310 includes the light inlet end 311 and the light outlet end 312, the first lens 320 is disposed between the light outlet end 312 and the plug-in 330, and the plug-in 330 includes a contact end 335. The contact end 335 is located on a surface that is of the plug-in 330 and that is away from the first lens 320, and a center of the contact end 335 is located on a focus on an optical path of the first lens 320. That is, light emitted from the first lens 320 is converged at the contact end 335, and the contact end 335 is arc-shaped for a purpose of a gapless interconnection with the optical fiber 400, so that end face reflection of the contact end 335 is reduced.

In this embodiment of the present application, the contact end 335 between the plug-in 330 and the optical fiber 400 is set to be arc-shaped, and the arc-shaped contact end 335 is in contact with an end face of the optical fiber 400, to implement the gapless interconnection. In this way, there is no air medium on an optical transmission path between the plug-in 330 and the optical fiber 400, and light directly enters the optical fiber 400 from the plug-in 330, so that the end face reflection of the contact end 335 can be reduced. In this application, a low feedback return loss close to or less than −30 dB may be made without using an optical isolator.

This helps stable use of a single-mode laser or a few-mode laser. For comparatively general contact between planes, because a planeness problem of the plane due to a machining tolerance, there is inevitably a gap between two planes that are in contact with each other. However, the contact end 335 in this application is arc-shaped, and an arc surface is in contact with the optical fiber 400. A contact manner may be line contact, and the line contact may implement gapless contact.

In an implementation, the plug-in 330 includes a first end face 331, a second end face 332, and a circumferential surface 333 that is connected between the first end face 331 and the second end face 332. The first end face 331 faces the first lens 320, the second end face 332 is away from the first lens 320, the second end face 332 is arc-shaped overall, and the contact end 335 is formed in a central region of the second end face 332. Specifically, the circumferential surface 333 is a cylindrical surface, or the circumferential surface 333 is an axisymmetric structure. A central axis of the axisymmetric structure is located on an optical axis of light output by the first lens 320. The first end face 331 is planar, and the first end face 331 may be perpendicular to the optical axis of the first lens 320.

In another implementation, referring to FIG. 4, the second end face 332 may also include an arc surface (that is, the contact end 335) and a pair of connection surfaces 336 that are located on two sides of the arc surface. The pair of connection surfaces 336 are respectively connected between two ends of the contact end 335 (arc surface) and the circumferential surface 333. Specifically, the pair of connection surfaces 336 may be symmetrically disposed on the two sides of the arc surface, and the pair of connection surfaces 336 may be planes, or may be other irregular surfaces. A specific shape of the second end face 332 is not limited in this application, provided that the contact end 335 in the central region of the second end face 332 is arc-shaped.

In an implementation, as shown in FIG. 2, the prism body 310 includes a conductive part 316 and a conductive assembly part 317 that are integrally formed. An accommodation space 3171 is disposed in the assembly part 317, and a bottom of the accommodation space 3171 is the light outlet end 312 of the prism body 310. The assembly part 317 includes a first end 3172 that is connected to the conductive part 316 and a second end 3174 that is away from the first end 3172. An opening 3173 is formed in the accommodation space 3171 at the second end 3174, and the opening 3173 allows the plug-in 330 and the optical fiber 400 (see FIG. 1) to insert into the accommodation space 3171. The circumferential surface 333 of the plug-in 330 is in contact with a side wall 3175 of the accommodation space 3171.

The assembly part 317 may be hollow sleeve shaped, and a protrusion may be further disposed on an outer circumferential surface of the assembly part 317. The protrusion may be configured to implement limiting between the transmitter optical sub-assembly 300 and a peripheral element, for example, fixing the transmitter optical sub-assembly 300 to a housing of an optical transceiver. A shape and a size of the accommodation space 3171 in the assembly part 317 match the optical fiber 400, and the optical fiber 400 is inserted into the accommodation space 3171. An outer surface of the optical fiber 400 and the side wall 3175 of the accommodation space 3171 are in contact to implement positioning the optical fiber 400. In addition, the plug-in 330 is also inserted into the accommodation space 3171, and both the plug-in 330 and an axial position of the optical fiber 400 may be determined by using the side wall 3175 of the accommodation space 3171. In an implementation, the accommodation space 3171 is a cylindrical structure or an axisymmetric structure, and a central axis of the accommodation space 3171 is an optical axis of the light outlet end 312 of the prism body 310.

Figure 3:
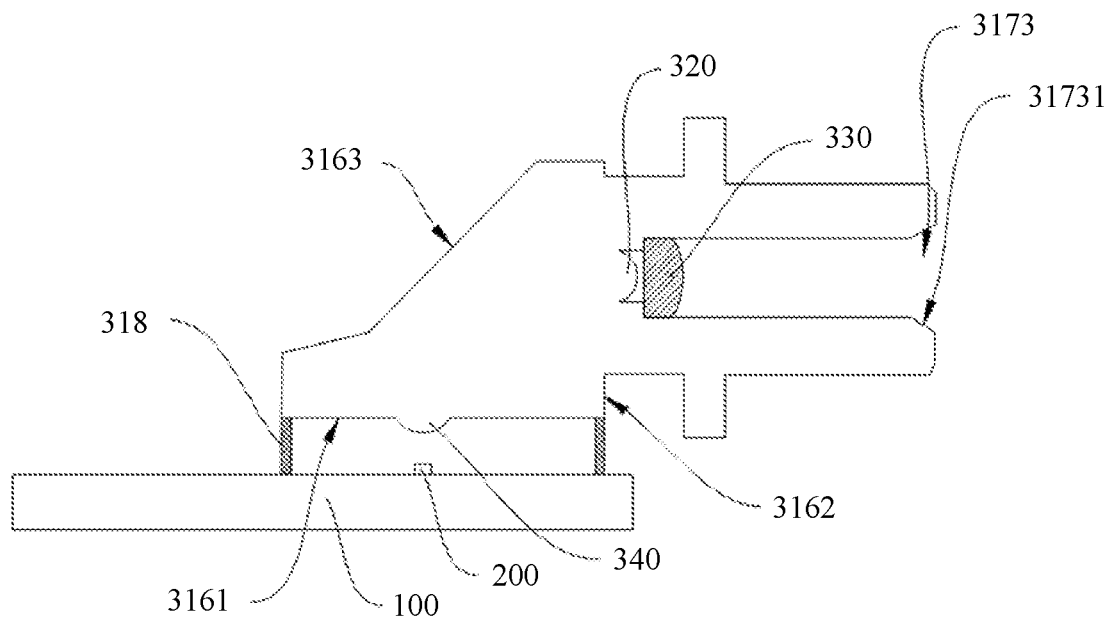
FIG. 3 is a schematic diagram of installing a transmitter optical sub-assembly on a substrate according to another implementation of the present application.

Referring to FIGS. 2 and 3, a mounting oblique surface 31731 is disposed at the opening 3173 of the assembly part 317, and an included angle (the included angle may be from 15 degrees to 45 degrees) is formed between the mounting oblique surface 31731 and the optical axis. Setting of the mounting oblique surface 31731 facilitates guiding of installing processes of the plug-in 330 and the optical fiber 400, thereby implementing higher alignment efficiency in an assembly process.

In an implementation, the first lens 320 is integrally formed at the light outlet end 312 of the prism body 310. An integrated structure may achieve higher optical conduction efficiency and effectively reduce a return loss. Certainly, the first lens 320 and the prism body 310 may be alternatively separated structures. The first lens 320 is installed from the opening of the accommodation space 3171 to the light outlet end 312, and a position of the first lens 320 is limited by using a limiting structure that is disposed at a position of the light outlet end 312.

In an implementation, the side wall 3175 of the accommodation space 3171 includes a limiting step 3176. The limiting step 3176 faces the opening 3173, and the limiting step 3176 is configured to abut against the first end face 331 of the plug-in 330. In this implementation, a position of the plug-in 330 is limited by using the limiting step 3176, so that after the plug-in 330 is inserted into the accommodation space 3171, the contact end 335 of the plug-in 330 may be on the focus of the first lens 320 by abutting against the limiting step 3176. The first end face 331 of the plug-in 330 may be fixed to the limiting step 3176 by using optical adhesive.

In an implementation, the conductive part 316 includes a first surface 3161, a second surface 3162, and a reflective surface 3163. The light inlet end 311 is disposed on the first surface 3161, and the light outlet end 312 is disposed on one side of the second surface 3162. The light outlet end 312 disposed on one side of the second surface 3162 means that the light outlet end 312 may be disposed on the second surface 3162, or may be disposed on another surface close to the second surface 3162. The assembly part 317 is connected to the second surface 3162, and the reflective surface 3163 is configured to reflect light incident from the light inlet end 311 to the light outlet end 312. In this application, the reflective surface 3163 is disposed between the light inlet end 311 and the light outlet end 312 of the conductive part 316, and the light incident from the light inlet end 311 is reflected to the light outlet end 312 by using the reflective surface 3163. This helps reduce a plane size of the conductive part 316, and effectively use a space size, to make the transmitter optical sub-assembly 300 have advantages of being small and having good space usage.

Specifically, an extension direction of the first surface 3161 is perpendicular to an extension direction of the second surface 3162. Perpendicularity described herein also includes approximate perpendicularity. An included angle between the first surface 3161 and the second surface 3162 may be in an appropriate range approximate to 90 degrees, for example, a range from 80 degrees to 100 degrees is approximate perpendicularity. An included angle between the reflective surface 3163 and the first surface 3161 is 45 degrees.

In an implementation, a second lens 340 is disposed on the first surface 3161, and the second lens 340 is integrally formed at the light inlet end 311 of the prism body 310. It may be understood that the second lens 340 and the prism body 310 may be alternatively separated structures.

Referring to FIG. 3, in an implementation, the prism body 310 further includes a support part 318, and the support part 318 is connected to the first surface 3161 of the conductive part 316. The support part 318 surrounds the second lens 340 and is configured to support the conductive part on the substrate 100. The support part 318 is connected to the substrate 100, and the support part 318, the substrate 100, and the first surface 3161 jointly form an enclosed surrounding space. The support part 318 may be fixed to the substrate 100 and is sealed by using adhesive, and a waterproof structure may be disposed to protect a light source device (that is, the laser 200) on the substrate 100. Specifically, a groove may be disposed on a surface of the substrate 100, and waterproof adhesive is filled in the groove. Then, the support part 318 is aligned with the groove, and the support part 318 is bonded into the groove by using the waterproof adhesive. One end of the support part 318 is embedded into the groove to form the waterproof structure.

A dielectric optical constant of the plug-in 330 is close to or the same as a dielectric optical constant of the optical fiber 400. In an implementation, the plug-in 330 is made of a glass material, and a core of the optical fiber 400 is also made of a glass material. That the dielectric optical constant of the plug-in 330 and the dielectric optical constant of the optical fiber 400 are close means that a difference between the dielectric optical constant of the plug-in 330 and the dielectric optical constant of the optical fiber 400 is comparatively small. Specifically, the dielectric optical constant of the plug-in 330 and the dielectric optical constant of the optical fiber 400 meet the following conditions. The dielectric optical constant of the plug-in 330 is greater than a dielectric optical constant of air, and a smaller difference between the dielectric optical constant of the plug-in 330 and the dielectric optical constant of the optical fiber 400 is better. For example, the dielectric optical constant of the air is 1, the dielectric optical constant of the optical fiber 400 is 1.5, and the dielectric optical constant of the plug-in 330 is greater than 1 and close to 1.5, for example, the dielectric optical constant of the plug-in 330 is between 1.3 and 1.5. Optimally, the dielectric optical constant of the plug-in 330 is 1.5.

In an implementation, the plug-in 330 is a ceramic ferrule. A connector of the optical fiber 400 is an LC connector or an SC connector. The SC connector is a standard square connector. Such a connector is made of engineering plastic, and is heat-resisting and oxidation resisting. The SC connector is usually used for an optical interface of a transmission device. The LC connector is similar to the SC connector in shape and is smaller than the SC connector. This application is applicable to an MMF optical fiber or an SMF optical fiber. The SMF optical fiber is a single-mode fiber (SMF), and the MMF fiber is a multi-mode optical fiber, that is the multi-mode optical fiber.

The foregoing descriptions are merely specific implementations of the present application, but are not intended to limit a protection scope of the present application. Any variation or replacement figured out by a person skilled in the art within the technical scope disclosed in the present application shall fall within the protection scope of the present application. Therefore, the protection scope of the present application shall be subject to the protection scope of the claims.

What is claimed is:

1. A transmitter optical sub-assembly, comprising:
a prism body comprising an accommodation space, a light inlet end and a light outlet end;
a first lens; and
a plug-in;
wherein:
the first lens is disposed between the light outlet end and the plug-in;
the plug-in comprises a contact end on a surface thereof and that is away from the first lens, a center of the contact end is located on a focus on an optical path of the first lens, and the contact end is arc-shaped to provide a gapless interconnection with an optical fiber; and
a bottom of the accommodation space is the light outlet end of the prism body, the prism body comprises a first end and a second end that is away from the first end, an opening is formed in the accommodation space at the second end, the opening allowing the plug-in and the optical fiber to be inserted into the accommodation space, and the circumferential surface of the plug-in is in contact with a side wall of the accommodation space to fix the plug-in in place within the accommodation space.

2. The transmitter optical sub-assembly according to claim 1, wherein the plug-in comprises a first end face, a second end face, and a circumferential surface that is connected between the first end face and the second end face, wherein the first end face faces the first lens, the second end face is away from the first lens, the second end face is arc-shaped and the contact end is formed in a central region of the second end face.

3. The transmitter optical sub-assembly according to claim 2, wherein the prism body comprises a conductive part and an assembly part that are integrally formed, the accommodation space is disposed in the assembly part, and the assembly part comprises the first end that is connected to the conductive part and the second end that is away from the first end.

4. The transmitter optical sub-assembly according to claim 3, wherein the first lens is integrally formed at the light outlet end of the prism body.

5. The transmitter optical sub-assembly according to claim 3, wherein the side wall of the accommodation space comprises a limiting step, wherein the limiting step faces the opening, and the limiting step is configured to abut against the first end face of the plug-in.

6. The transmitter optical sub-assembly according to claim 3, wherein the conductive part comprises:
a first surface;
a second surface; and
a reflective surface;
wherein the light inlet end is disposed on the first surface, the light outlet end is disposed on one side of the second surface, and the assembly part is connected to the second surface, and the reflective surface is configured to reflect light incident from the light inlet end to the light outlet end.

7. The transmitter optical sub-assembly according to claim 6, wherein an extension direction of the first surface is perpendicular to an extension direction of the second surface.

8. The transmitter optical sub-assembly according to claim 6, further comprising a second lens disposed on the first surface, and the second lens is integrally formed at the light inlet end of the prism body.

9. The transmitter optical sub-assembly according to claim 8, wherein the prism body further comprises a support part, the support part is connected to the first surface of the conductive part, and the support part surrounds the second lens and is configured to support the conductive part on a substrate.

10. The transmitter optical sub-assembly according to claim 1, wherein a dielectric optical constant of the plug-in is close to or the same as a dielectric optical constant of the optical fiber.

11. An optical transceiver assembly, comprising:
a substrate;
a laser disposed on the substrate; and
a transmitter optical sub-assembly comprising:
  a prism body comprising an accommodation end, a light inlet end and a light outlet end;
  a first lens; and
  a plug-in;
  wherein:
    the first lens is disposed between the light outlet end and the plug-in;
    the plug-in comprises a contact end located on a surface thereof and that is away from the first lens, a center of the contact end is located on a focus on an optical path of the first lens, and the contact end is arc-shaped to provide a gapless interconnection with an optical fiber;
    a light inlet end of the prism body faces the laser to receive light emitted by the laser, and the light enters the optical fiber after passing through the light outlet end and the plug-in; and
  a bottom of the accommodation space is the light outlet end of the prism body, the prism body comprises a first end and a second end that is away from the first end, an opening is formed in the accommodation space at the second end, the opening allowing the plug-in and the optical fiber to be inserted into the accommodation space, and the circumferential surface of the plug-in is in contact with a side wall of the accommodation space to fix the plug-in in place within the accommodation space.

12. The optical transceiver assembly according to claim 11, wherein the plug-in comprises a first end face, a second end face, and a circumferential surface that is connected between the first end face and the second end face, wherein the first end face faces the first lens, the second end face is away from the first lens, the second end face is arc-shaped, and the contact end is formed in a central region of the second end face.

13. The optical transceiver assembly according to claim 12, wherein the prism body comprises a conductive part and an assembly part that are integrally formed, the accommodation space is disposed in the assembly part, and the assembly part comprises a first end that is connected to the conductive part and a second end that is away from the first end.

14. The optical transceiver assembly according to claim 13, wherein the first lens is integrally formed at the light outlet end of the prism body.

15. The optical transceiver assembly according to claim 13, wherein the side wall of the accommodation space comprises a limiting step, wherein the limiting step faces the opening, and the limiting step is configured to abut against the first end face of the plug-in.

16. The optical transceiver assembly according to claim 13, wherein the conductive part comprises:
a first surface;
a second surface; and
a reflective surface;
wherein the light inlet end is disposed on the first surface, the light outlet end is disposed on one side of the second surface, and the assembly part is connected to the second surface, and the reflective surface is configured to reflect light incident from the light inlet end to the light outlet end.

17. The optical transceiver assembly according to claim 16, wherein an extension direction of the first surface is perpendicular to an extension direction of the second surface.

18. The optical transceiver assembly according to claim 16, further comprising a second lens disposed on the first surface, and the second lens is integrally formed at the light inlet end of the prism body.

19. The optical transceiver assembly according to claim 18, wherein the prism body further comprises a support part, the support part is connected to the first surface of the conductive part, and the support part surrounds the second lens and is configured to support the conductive part on the substrate.

20. The optical transceiver assembly according to claim 11, wherein a dielectric optical constant of the plug-in is close to or the same as a dielectric optical constant of the optical fiber.

21. The optical transceiver assembly according to claim 9, wherein a groove is disposed on the surface of the substrate, wherein the support part is aligned with the groove and bonded into the groove with adhesive.

22. The optical transceiver assembly according to claim 2, wherein the first end face is fixed to the bottom of the accommodation space by adhesive.

23. The optical transceiver assembly according to claim 1, wherein a diameter of the plug-in is the same as that of the optical fiber, and the side wall of the accommodation space.

24. The optical transceiver assembly according to claim 1, wherein the plug-in comprises a first end face, a second end face, and a circumferential surface that is connected between the first end face and the second end face, wherein the first end face faces the first lens, the second end face is away from the first lens, the second end face comprises arc-shaped surface and a pair of connection surfaces that are respectively connected between two ends of the arc-shaped surfaces, and the contact end is formed in a central region of the second end face.

25. The optical transceiver assembly according to claim 24, wherein the pair of connection surfaces are planes or irregular surfaces.

* * * * *